Nov. 27, 1956　　　H. H. WATSON　　　2,771,918

SAW BLADE WITH SWAGED TEETH

Filed Nov. 16, 1954

INVENTOR.
HERMAN H. WATSON
BY

United States Patent Office 2,771,918
Patented Nov. 27, 1956

2,771,918

SAW BLADE WITH SWAGED TEETH

Herman H. Watson, Dallas, Ga., assignor to Paulding Products Corporation, a corporation of Georgia Application November 16, 1954, Serial No. 469,135

2 Claims. (Cl. 143—133)

This invention relates to saws and more particularly to power driven saws such as band saws, circular disc saws, and the like, in which a multiplicity of teeth are disposed along the edge of a moving carrier element such as a band or disc.

One of the objects of the invention is to provide a saw of the character indicated which will make a smoother cut at a more rapid rate of speed than is possible with any other saw of which I have knowledge, and to do this with a minimum expenditure of power and a minimum of intensive attention upon the part of the operator.

Figure 1:
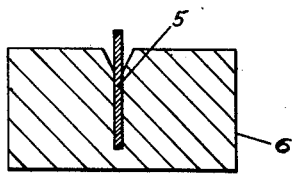
Figure 2:
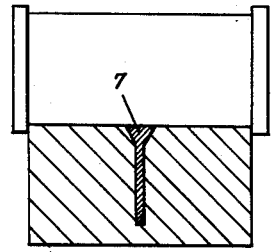
Figure 3:
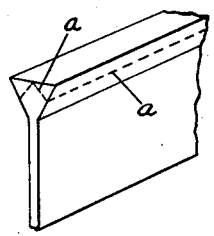

The advantages of my improved saw will be best understood by reference to the accompanying drawing, wherein:

Fig. 1 is a transverse vertical section through a die with a blank placed therein preparatory to swaging the top edge of the blank, Fig. 2 is a transverse vertical section through the blank of Fig. 1 showing the metal of the upper edge portion of the blank swaged out to produce a flaring head, Fig. 3 is a perspective view of the blank and head, illustrating in dotted lines how the head is to have its edges cut away to leave teeth that will have their front ends, substantially, diamond shaped.

Figure 4:
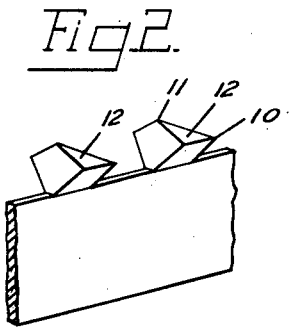
Figure 5:
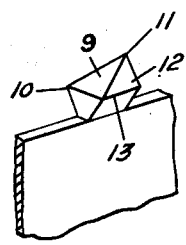
Figure 6:
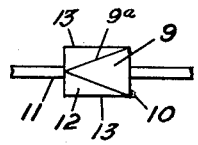
Figure 7:
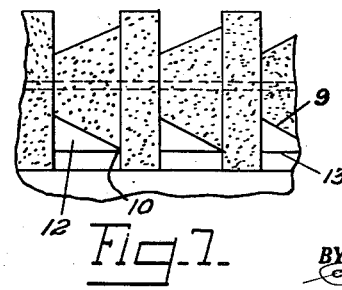

Fig. 4 is a perspective view of the carrier blank showing a pair of the finished teeth thereon, Fig. 5 is a sectional perspective view looking from the rear of one of the teeth, Fig. 6 is a plan view of one of the teeth, Fig. 7 is a side view illustrating a grinding wheel shaped to form the spaced teeth and to relieve the same in the same operation by slicing transversely across the swaged web.

The parts are magnified in all the figures of the drawing.

Like numerals designate corresponding parts in all of the figures of the drawing.

I have found that an expeditious and efficient way of producing a saw having the desired characteristics is to start with a blank 5 and by applying pressure to the edge of the same in a die 6, swage said edge out to form a flaring web or rib 7 along said edge. The rib is then sliced through transversely at a plurality of points to leave a row of outstanding tooth forming abutments. In the transverse slicing of the rib 7 (which may be effected by punch press, grinding or any other suitable means) a tool of such shape is employed that the upper portions of the abutments are cut away to leave flat triangular top surfaces 9, the apices of such triangular top surfaces being at the top central portion of the front wall of the tooth and extending thence along the lines 9ª to the rear corners 10 of the abutments; and it is the point 11 of the tooth which first contacts the material being cut and which starts the cutting action. The formation of the surfaces 9 relieves the teeth in their action. The material of the abutments is further slabbed off upon each side of their longitudinal center lines to form inclined faces 12 the upper edges of which coincide with the lines 9ª and the lower edges of which terminate at the side edges 13 of the abutments. These side edges represent the point of greatest width of the abutments. The side edges of the abutments are preferably in parallelism with each other and when they are in parallelism with each other and in alignment with the side edges of all the other abutments, it follows that the faces 12 all lie in the same plane. This is highly advantageous since by passing a grinding wheel along the row of these surfaces 12 they may all be ground accurately to the same extent, whereby to effect the sharpening of the saw.

While I have stated that the transverse cutting of the blank to produce the abutments is effected before the slabbing off of the outer upper corners of the web to produce the inclined surfaces 12, I wish to be understood that the invention is not limited in this respect since the slabbing off may be effected before the transverse slicing, if desired. In Fig. 3 it is indicated by the dotted lines "a" how the outer free corners of the web as it leaves the forming die may be cut away to the angle to leave the surfaces 12. Whether the slabbing off is effected before or after the transverse slicing the end result is to leave tooth forming abutments the front faces of which are of substantially diamond shape with the top of the diamond constituting the initial cutting point at about the center line of the web.

Where the transverse slicing or cutting is effected by a punch press the male members of the punching mechanism may, if desired, be of such shape as to effect a slight undercutting of the front walls of the teeth to impart a rake thereto, this being common practice in the formation of saw teeth.

The transverse distance between the side edges 13 of the teeth represents the approximate width of the kerf which will be cut by this saw. I am able to cut even very hard material with this saw while forming a much narrower kerf than is the case with ordinary saws. Many and in fact most of the saws now used have teeth of spring formation capable of being bent outwardly and alternately in opposite directions to give a set to the saw. Since these teeth tend to move back toward alignment with the carrier body under the stress imposed upon them, and thus require resetting, there is always the tendency to give the saw too much set. Thus the outwardly projecting ends, when moved in sawing direction have a tendency to gouge the material instead of cutting it. Since the edges 13 represent the terminal portions of what are, in effect, solid integral protuberances extending from the carrier body it follows that there is no gouging of the character indicated in the operation of this saw. Upon the contrary there is a clean, non-tearing cutting action.

The saw of this invention presents important functional advantages in the cutting of meat for the following reasons:

The cutting of meat, fish and like animal products differs from the cutting of almost all other substances in that the operator is alternately cutting through flesh (meat) and bone. Where the saw is so constructed as to cut a sufficiently wide kerf to adapt it to pass readily through bone it is so wide that when passing through the fleshy parts it unnecessarily cuts and shreds many meat fibres. These shredded meat particles, being greasy and adherent, collect in the gullets between the teeth and are deposited as a greasy film or paste over the meat surface that has been cut. Since these particles present many cut surfaces to the air their presence would tend to induce quick spoilage of the meat, unless they were removed. The saw of the present invention acting as it does by a true cutting rather than a gouging action does not macerate the fleshy parts in passing through them and in addition, does not create so wide a kerf in the bony parts.

An important feature of this invention is that the teeth are so shaped and the surfaces to be created lie in such planes that the material that has to be removed may be removed by a straight line thrust by a grinder or a punch press. As a result a multiplicity of the teeth may be acted on en banc instead of each tooth having to be formed or treated separately.

Where a punch press is used the hardening treatments given all saw blades takes place immediately after the cutting of the teeth but where a grinder is used for the cutting the hardening may take place before the cutting. Thus there is no heat treatment which would be likely to produce scale, after grinding.

By my method I am able to deliver to the user a saw blade having the advantages recited and one which is clean, sharp and free of scale.

The set-forming abutments of which the edges 13 are the terminus, being unyielding, and hardened will not readily change their formation. Thus my saw will be very long lived and may be kept sharp and effective throughout its life with very little attention.

In the case of saws having alternately bent teeth to create a set, there is a twisting tendency imparted to the carrier body. No such tendency is present in the saw of my invention since the leading or cutting point 11 and the side edges 13 of the set-forming abutments all lie and travel in parallel paths. The edges 13 and the rear transverse edges of the teeth all lie in the same transverse plane, which plane is at the widest point of the diamond shaped front face of the teeth. The action of the point 11 initiates a cut of V shape which increases in width to the width of the abutments as the teeth sink into the material being cut.

This saw is not dependent upon the exercise of any great pressure against the work in order to effect a cut. In this respect it differs from any other saw of which I have knowledge. The absence of pressure against the work eliminates much heat that would otherwise be generated and avoids the sticking or freezing of the saw in the work. This absence of heating enables me to saw a stack of thin sheets of metal without resultant sticking of the sheets together.

The invention is not limited to the precise construction shown. It includes within its purview whatever changes fairly come within either the terms or the spirit of the appended claims.

I claim:

1. A saw comprising a metallic web and a row of teeth along its edges, said teeth presenting front and opposite side walls, the front faces being of diamond shape with their apices in substantial vertical alignment with the vertical axis of the web, the width of the teeth being such as to cause the side-edges of the teeth to project laterally, materially beyond the web, the diamond shape of the front faces of the teeth causing the teeth to present a part of greatest width that is substantially within the height of the diamond shaped front face, those portions of the teeth below said point of greatest width being substantially uniform in cross sectional shape throughout the length of the teeth and those portions of the teeth which lie above said point of greatest width being shaped to provide an inclined triangular surface which extends from the apex of the front wall to the opposite rear corners of those portions of the teeth which lie above the web, the said side edges of the teeth lying in parallelism with each other and in parallelism with the outer faces of the webs.

2. A saw comprising a metallic web and a row of teeth forming abutments integral with the web and disposed along the edge of the web, the said abutments being materially wider than the material of the web and being shaped to have front faces of substantially diamond shape, the said teeth having side edges extending the full length of the teeth, which edges are parallel with each other and parallel with the outer face of the web, said edges lying in the transverse plane of the widest portion of the diamond shaped front face, the rear edges of the teeth lying in the said transverse plane and perpendicular to the said side edges, those portions of the teeth above said plane presenting three flat triangular faces, one of which extends from the apex of its tooth at the top of the diamond shaped front face to the opposite rear corners of the teeth and the other two extending from the side edges of the first named triangular portion to the adjacent side edges of the teeth.

References Cited in the file of this patent

UNITED STATES PATENTS

| Number | Name | Date |
|---|---|---|
| 32,796 | Southworth | July 9, 1861 |
| 324,357 | Brown | Aug. 18, 1885 |
| 1,109,458 | Plowder | Sept. 1, 1914 |
| 1,240,939 | Carlson | Sept. 25, 1917 |
| 1,371,008 | Vander Wee | Mar. 8, 1921 |
| 1,690,803 | Vander Wee | Nov. 6, 1928 |
| 1,918,770 | McLean | July 18, 1933 |
| 2,644,494 | Lundberg | July 7, 1953 |
| 2,734,533 | Roberts | Feb. 14, 1956 |